United States Patent [19]

Lee

[11] Patent Number: 5,662,035

[45] Date of Patent: Sep. 2, 1997

[54] CLEANING DEVICE OF A SCREW PRESS FOR FILTERING AND DEHYDRATING GARBAGE

[75] Inventor: Chung Yup Lee, Jongwon Villa 6-201, 393-78, Daeboug-dong, Dongjak-ku, Seoul, Rep. of Korea

[73] Assignees: Young Tae Kim; Chung Yup Lee, both of Seoul, Rep. of Korea

[21] Appl. No.: 563,648

[22] Filed: Nov. 28, 1995

[30] Foreign Application Priority Data

Nov. 28, 1994 [KR] Rep. of Korea ............... 94-31466

[51] Int. Cl.$^6$ ........................... B30B 9/14
[52] U.S. Cl. ................ 100/112; 100/127; 100/145
[58] Field of Search ............. 100/73–75, 93 S, 100/112, 117, 127, 145

[56] References Cited

U.S. PATENT DOCUMENTS 3,021,254  2/1962  Helversen et al. ............ 100/127
3,938,434  2/1976  Cox ............................ 100/112

FOREIGN PATENT DOCUMENTS 36306  11/1987  Rep. of Korea.
46331  11/1989  Rep. of Korea.

*Primary Examiner*—Stephen F. Gerrity
*Attorney, Agent, or Firm*—Jacobson, Price, Holman & Stern, PLLC

[57] ABSTRACT

A cleaning device of a screw press for filtrating and dehydrating garbage in which a plurality of dehydrate liquid guide grooves are circumferentially formed on an inner surface of a support cylinder which supports an outer surface of the filtration cylinder so as to permit the support cylinder to be less in contact with the filteration cylinder. Moreover, a dehydrate fluid is discharged through discharging holes, thereby improving filtration efficiency. In addition, a compression air, a pressurized water or high pressure steam is injected from the circumferential surface of a screw being rotated within the filtration cylinder to enable garbage remaining at a plurality of filtrating holes to be completely and cleanly discharged outside, thereby enhancing filtration effectiveness.

7 Claims, 2 Drawing Sheets

2

CLEANING DEVICE OF A SCREW PRESS FOR FILTERING AND DEHYDRATING GARBAGE

BACKGROUND OF THE INVENTION

The present invention relates to a cleaning device, and more particularly to a cleaning device of a screw press for filtrating and dehydrating garbage which is capable of effectively filtrating and dehydrating garbage discharged from a night-soil disposal plant, a sewage disposal plant and various production factories and also by which the remnants remaining at a plurality of filtrating holes of a filtrating cylinder can be cleaned by injecting a compression air, a pressurized water or high pressure steam within the filtrating cylinder. A number of dehydrate liquid guide grooves are formed circumferentially on an inner surface of a support cylinder for outwardly supporting the filtrating cylinder having a plurality of holes so as to enable the remnant fluid filtrated and dehydrated by the filtrating cylinder to be discharged by being guided to the plurality of holes of the support cylinder, thereby advantageously performing filtrating and dehydrating of the filtrating cylinder. At the same time, the compression air, the pressurized water or the high pressure steam is provided to a tapered cylinder having a screw formed therein and is injected from the outer circumferential surface of the screw so as to discharge and clean the garbage remaining at the plurality of filtrating holes, thereby enhancing the effectiveness of the filtration and dehydration of the filtrating cylinder.

The Korean Utility Model Registration Nos. 36306 and 46331 disclose respectively a support cylinder for circumferentially supporting the outer surface of the filtration cylinder. However, filtration is performed just around the discharging holes, causing ineffective filtration and dehydration due to the insufficient filtration area. Moreover, because the filtration cylinder is cleaned, while being rotated, by injecting the compression air, the pressurized water or the high pressure steam provided from the circumferential surface by means of an injection nozzle, garbage coming out through a plurality of the filtrating holes of the filtration cylinder by the rotative compression force of a screw being rotated within the filtration cylinder is hardly able to be suitably cleaned, resulting in deterioration of the filtration efficiency. Therefore, the inside and the outside of the filtration cylinder must be cleaned while stationary.

SUMMARY OF THE INVENTION

The present invention resolves such a problem and provides a cleaning device of a screw press for filtrating the dehydrating garbage in which a plurality of dehydrate liquid guide grooves are circumferentially formed on an inner surface of a support cylinder for supporting an outer surface of a filtration cylinder so as to permit the support cylinder to have less contact with the filtration cylinder and to make a large area for filtrating and dehydrating. Moreover, a dehydrate fluid is guided to a plurality of guide grooves circumferentially formed at the support cylinder and is discharged through discharging holes, thereby improving filtration efficiency. In addition, a compression air, pressurized water or high pressure steam is injected at the outer circumferential part of a screw being rotated within the filtration cylinder to enable garbage remaining at filtrating holes to be completely and cleanly discharged outside, thereby enhancing filtration effectiveness.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

A construction of the cleaning device according to the present invention will now be described with general reference to the accompanying drawings, FIGS. 1–4.

Figure 1:
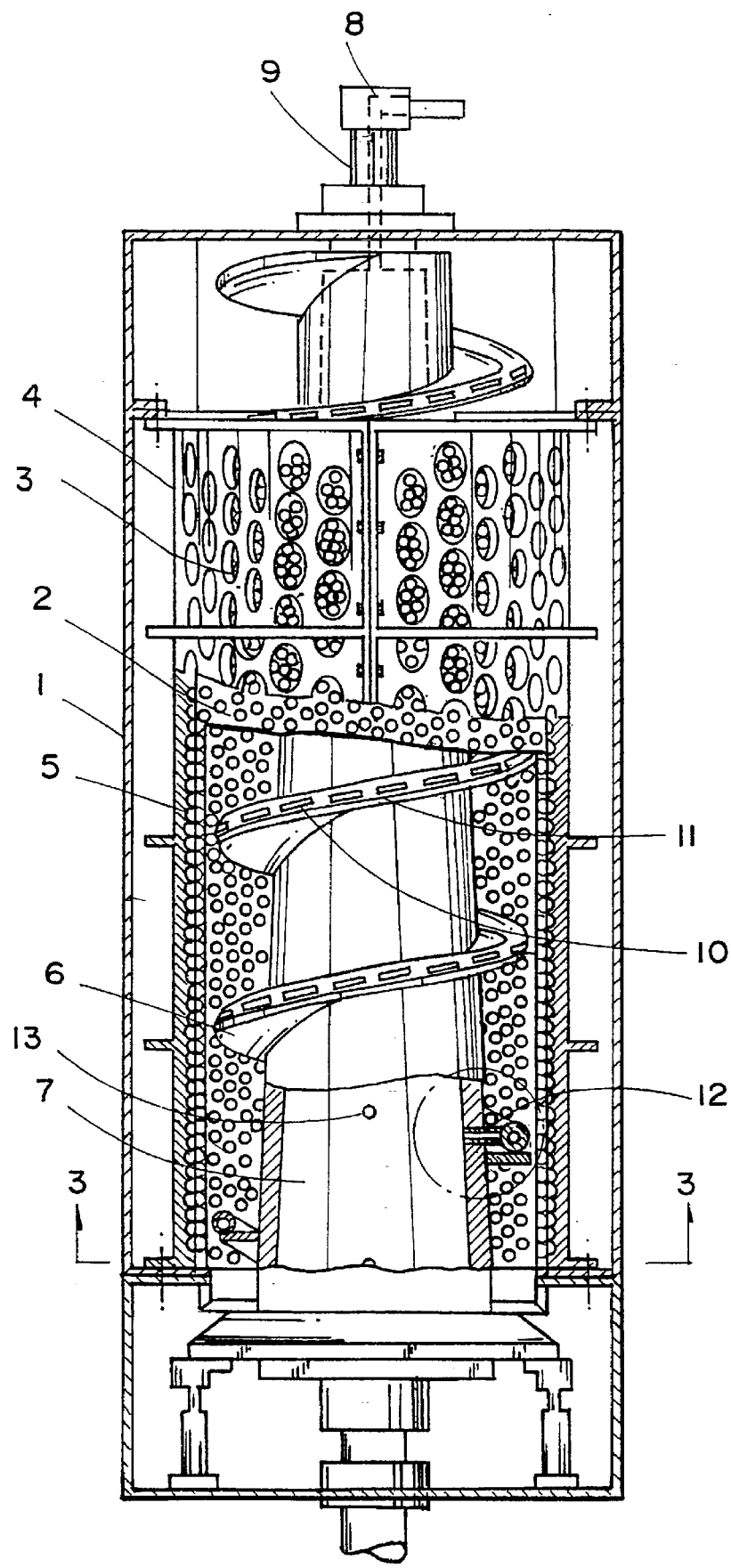
FIG. 1 is a partially cut cross-sectional view in accordance with the present invention.
Figure 2:
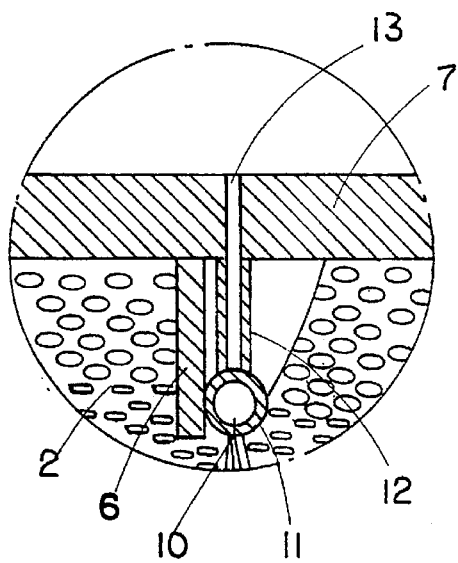
FIG. 2 is an enlarged view of the inside part of a circle in dotted line of FIG. 1.
Figure 3:
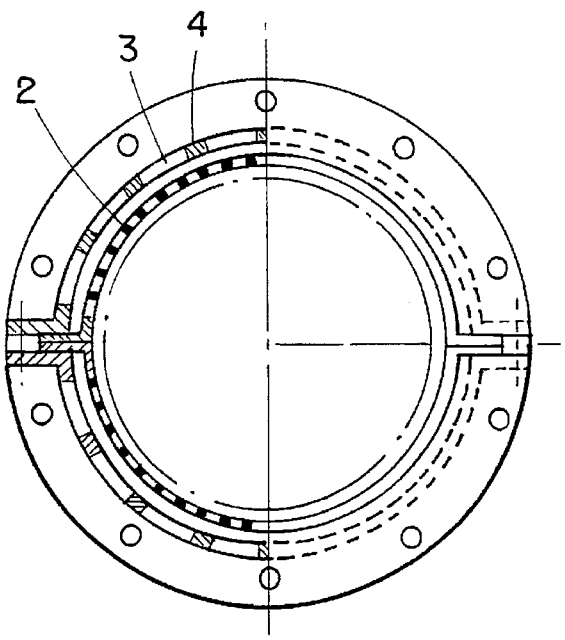
FIG. 3 is a partial cross-sectional view taken along the line of 3—3 in accordance with the present invention.
Figure 4:
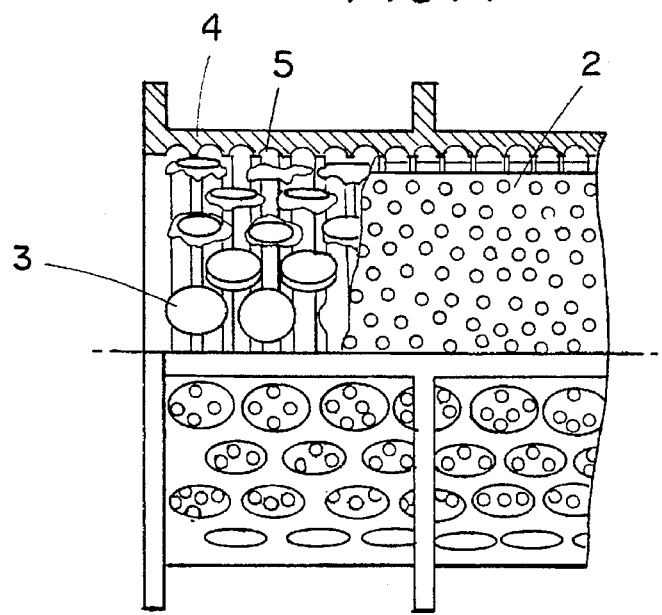
FIG. 4 is a partially cut cross-sectional view of a support cylinder in accordance with the present invention.

FIGS. 1 and 2 show dehydrate liquid guide grooves(5) circumferentially formed at regular intervals on an inner surface of a support cylinder(4) having a plurality of holes (3) for supporting an outer surface of a filtration cylinder(2) disposed inside a single body(1). A filtration dehydrate liquid is guided so as to be discharged through the plurality of holes in the support cylinder(4). A tube-type rotating shaft(9) having a supply port(8) for supplying a compression air, a pressurized water or high pressure steam is connected at the front side of a tapered cylinder(7) connected to a screw formed at an inside of the filtration cylinder(2). As shown in more detail by FIG. 2, an injection pipe(11) having a plurality of injection holes(10) is attached at regular intervals according to a protruded circumference surface of the screw(6) by welding, thereby being relatively moved with the movement of fluid supply holes(13) formed at regular intervals on the tapered cylinder(7) and a supply pipe(12).

An operational effect of the cleaning device according to the present invention will now be described.

A plurality of dehydrate liquid guide grooves(5) are circumferentially formed at regular intervals on an inner surface of the support cylinder(4) having the plurality of holes for supporting an outer surface of the filtration cylinder(2) disposed within the body(1), so that the dehydrate liquid filtrated and dehydrated by being compressed by the screw(6) disposed inside the filtration cylinder(2) is guided along the dehydrate liquid guide grooves(5) and then is discharged through the plurality of holes(3) formed at the support cylinder(4). Therefore, since the filtration area of the filtration cylinder(2) is wide, a large amount of garbage can be filtrated and dehydrated. In the meantime, in the course of filtrating and dehydrating the garbage, the cleansing matter (which comprises compression air, the pressurized water or high pressure steam) is supplied through the supply port(8) disposed at the tube-type rotating shaft(9) of the inside of the tapered cylinder(7) having the screw(6) formed within the filtration cylinder(2). The cleansing matter is supplied to the injection pipe(11) attached by welding along the circumferential surface of the screw(6) through the supply pipe(12) which is connected to the fluid supply holes(13) formed at the tapered cylinder(7) at regular intervals and then is injected to the injection holes(10) formed on the injection pipe(11) at regular intervals. Then, the garbage remaining at the filtration holes of the filtration cylinder(2) is cleaned by being pushed out from the inside thereof, so that the filtration holes are always cleaned, preventing the filtration holes from blocking during filtration and dehydrating. Furthermore, since the dehydrate liquid is smoothly discharged, sludge with little moisture is obtained for processing. Moreover, in case that the fluid to be supplied to the tapered cylinder(7) is heated at a high temperature, since protein contained in the garbage can be solidified, a more effective filtration and dehydration is achieved.

Having described the invention, many modifications thereto will become apparent to those skilled in the art to which it pertains without deviation from the spirit of the invention as defined by the scope of the appended claims.

I claim:

1. A screw press for filtrating and dehydrating garbage, comprising:

a plurality of dehydrate liquid guide grooves circumferentially formed on an inner surface of a support cylinder having a plurality of holes and outwardly supporting a filtration cylinder disposed inside a single body, wherein a filtrated and dehydrated fluid is guided by a cleansing matter along the guide grooves so as to be discharged through the plurality of the holes of the support cylinder;

a tube-type rotating shaft mounted to a supply port connected to a tapered cylinder forming a screw inside the filtration cylinder, the screw comprising a protruded circumferential surface, wherein the supply port supplies the cleansing matter to a plurality of fluid supply holes located in the tapered cylinder;

a supply pipe connected to the fluid supply holes for transporting cleansing matter;

an injection pipe attached at regular intervals along the protruded circumferential surface and connected to the supply pipe for transporting cleansing matter; and, injection holes located at regular intervals along the injection pipe for discharging the cleansing matter.

2. The screw press of claim 1, wherein the injection pipe is welded to the protruded circumferential surface of the screw.

3. A screw press for filtrating and dehydrating garbage, comprising:

a support cylinder having a plurality of holes and an inner surface;

a filtration cylinder disposed inside the support cylinder;

a supply port for supplying cleansing matter;

a tapered cylinder connected to the supply port and having a protruded circumferential surface forming a screw disposed inside the filtration cylinder, wherein the tapered cylinder further comprises a plurality of supply holes, each supply hole connected to a first end of a supply pipe, and an injection pipe connected to a second end of the supply pipe, wherein the injection pipe comprises a plurality of injection holes located at regular intervals along the protruded circumferential surface of the screw such that cleansing matter is forced from the supply port through the injection holes at a high pressure;

a rotating shaft connected to the tapered cylinder; and, a plurality of dehydrate liquid guide grooves circumferentially formed on the inner surface of the support cylinder and aligned with the injection holes such that the cleansing matter and guide grooves guide a filtrated and dehydrated discharge fluid through the plurality of holes on the support cylinder.

4. The screw press of claim 3, wherein the injection pipe is welded to the protruded circumferential surface of the screw.

5. A screw press for filtrating and dehydrating garbage, comprising:

a support cylinder having a plurality of holes and an inner surface;

a filtration cylinder disposed inside the support cylinder;

a supply port for supplying cleansing matter;

a tapered cylinder connected to the supply port and having a protruded circumferential surface forming a screw disposed inside the filtration cylinder, wherein a plurality of injection holes are located at regular intervals along the protruded circumferential surface of the screw so that cleansing matter is forced from the supply port through the injection holes;

a rotating shaft connected to the tapered cylinder; and, a plurality of dehydrate liquid guide grooves circumferentially formed on the inner surface of the support cylinder and aligned with the injection holes such that the cleansing matter and guide grooves guide a filtrated and dehydrated discharge fluid through the plurality of holes on the support cylinder.

6. The screw press of claim 5, wherein the tapered cylinder further comprises a plurality of supply holes, each supply hole connected to a supply pipe at a first end, and an injection pipe connected to a second end of the supply pipe, wherein the injection pipe comprises the plurality of injection holes.

7. The screw press of claim 6, wherein the injection pipe is welded to the protruded circumferential surface of the screw.

* * * * *